(12) United States Patent
Soulie et al.

(10) Patent No.: US 7,940,788 B2
(45) Date of Patent: May 10, 2011

(54) SYSTEM FOR TRANSMITTING DATA WITHIN A NETWORK BETWEEN NODES OF THE NETWORK AND FLOW CONTROL PROCESS FOR TRANSMITTING THE DATA

(75) Inventors: Michael Soulie, Voiron (FR); Riccardo Locatelli, Grenoble (FR); Marcello Coppola, Moirand (FR)

(73) Assignee: STMicroelectronics SA, Montrouge (FR)

( * ) Notice: Subject to any disclaimer, the term of this patent is extended or adjusted under 35 U.S.C. 154(b) by 283 days.

(21) Appl. No.: 12/021,004

(22) Filed: Jan. 28, 2008

(65) Prior Publication Data
US 2008/0181115 A1 Jul. 31, 2008

(30) Foreign Application Priority Data

Jan. 29, 2007 (EP) .................................. 07290109

(51) Int. Cl.
*H04L 12/54* (2006.01)
(52) U.S. Cl. ........................ 370/428; 370/351
(58) Field of Classification Search .................. 370/351, 370/428
See application file for complete search history.

(56) References Cited

U.S. PATENT DOCUMENTS

| | | | |
|---|---|---|---|
| 5,684,791 A * | 11/1997 | Raychaudhuri et al. | 370/310.2 |
| 7,639,037 B1 * | 12/2009 | Eberle et al. | 326/21 |
| 7,668,979 B1 * | 2/2010 | Wentzlaff | 710/33 |
| 2003/0056084 A1 * | 3/2003 | Holgate et al. | 712/29 |
| 2004/0215753 A1 | 10/2004 | Chan et al. | 709/223 |
| 2004/0236802 A1 | 11/2004 | Baratakke et al. | 707/204 |
| 2005/0053084 A1 * | 3/2005 | Abrol et al. | 370/412 |
| 2006/0136570 A1 * | 6/2006 | Pandya | 709/217 |
| 2007/0064500 A1 * | 3/2007 | Harmsze et al. | 365/189.05 |
| 2007/0147379 A1 * | 6/2007 | Lee et al. | 370/392 |
| 2008/0101290 A1 * | 5/2008 | Sung et al. | 370/331 |
| 2008/0168259 A1 * | 7/2008 | Biran et al. | 712/207 |
| 2008/0205432 A1 * | 8/2008 | Gangwal | 370/458 |

FOREIGN PATENT DOCUMENTS

EP 1176766 A1 1/2002

OTHER PUBLICATIONS

Sang-Il Han et al "An Efficient Scalable and Flexable Data Transfer Architecture for Multiprocessor SoC with Massive distributed Memory" Design Automation Conference, 2004. Proceedings. 41$^{st}$ San Diego, CA, USA Jun. 7-11, 2004, pp. 250-255, XPO10715651.

* cited by examiner

*Primary Examiner* — Hong Cho
*Assistant Examiner* — Gautam Sharma
(74) *Attorney, Agent, or Firm* — Lisa K. Jorgenson; Allen, Dyer, Doppelt, Milbrath & Gilchrist, P.A.

(57) ABSTRACT

A system is for transmitting data in a network and includes emitter nodes, each including a transmitter for transmitting requests for data transmission. The system may also include a receiver node receiving the data transmission from the emitter nodes and including a first memory for storing data transmitted by each emitter node, a second memory for storing the requests, and a transmitter. The data may be transmitted from the emitter nodes to the receiver node when memory space is available in the first memory to receive data. The transmitter of the receiver node may transmit to each emitter node an acknowledgement message when memory space is available in the first memory to receive at least a portion of the data transmitted. Each emitter node may establish a communication link with the receiver node and transmits the data based upon the acknowledgement message. The communication link may be locked until all data is transmitted.

23 Claims, 2 Drawing Sheets

SYSTEM FOR TRANSMITTING DATA WITHIN A NETWORK BETWEEN NODES OF THE NETWORK AND FLOW CONTROL PROCESS FOR TRANSMITTING THE DATA

FIELD OF THE INVENTION

The invention relates, in general, to the transmission of data through nodes in a network. More particularly, the invention relates to transmitting data from emitter nodes to a receiver node in a network.

BACKGROUND OF THE INVENTION

Most modern very large scale integration (VLSI) systems may be built according to the so-called "System-on-Chip" (SoC) concept. SoC functionalities are the result of the cooperation between several simple modules, which are generally selected by the designer from a preexisting library. The designer's role is to map the SoC functions onto that of the modules of the library. However, effective communication and interconnection systems may be helpful to meet desired performance for the designed SoC and, in particular, to provide effective communication between the nodes of the network.

As system complexity increases, on-Chip communication may become more critical. And current on-Chip communication systems may become complex infrastructures. In the next few years, SoC may include hundreds of communicating blocks running at many Gigahertz. Such systems are known as multiprocessor System-on-Chips (MP-SoCs). Researchers have recently provided the so-called Network-on Chip (NoC) concept to overcome the limitations relating to significant efforts used to adequately design on-Chip communication systems, even for the MP-SoCs systems.

NoC is an approach to provide scalable and flexible communication architectures with suitable performance. Moreover, NoC provides the SoC architects with a tool for designing on-Chip communication systems quickly, thus increasing productivity and reducing time to market. NoC is a non-centralized architecture that may be physically implemented as a distributed communication infrastructure.

A potential issue when designing NoCs is that they have to guarantee deadlock-free operations. Deadlocks that can arise in NoCs can be broadly categorized in two classes, namely the so-called routing-dependent deadlocks and the so-called message-dependent deadlocks. It is generally admitted that routing-dependent deadlocks occur when there is a cyclic dependency of resources created by the packets on the various paths in the network. Numerous routing techniques, either based on avoidance or recovery, in which restricted routing functions are provided, have been developed and today's NoC designs are mostly free from routing-dependent deadlocks. However, obtaining a message-dependent deadlock-free network operation may still be an issue.

Message-dependent-deadlocks occur when interactions and dependencies are created between different message types at network endpoints, when they share resources in the network. Even when the underlying network is designed to be free from routing-dependent deadlocks, the message-level deadlocks can block the network indefinitely, thereby affecting proper system operation. Nevertheless, some attempts have been made to avoid message-dependent deadlocks.

Message-dependent deadlocks avoidance approaches can be broadly categorized into four classes. Buffer sizing comprises providing sufficient amounts of buffers at network endpoints to be reduce congestion. This approach may not, however, be suitable to the on-chip domain for area cost reasons. End-to-end flow control may be based on the guarantee that no data is lost in the network due to buffer overflow because of a node in the network is allowed to send a packet over the network if and only if a sufficient memory space is available in a destination node of the network. This flow control process may be implemented using end-to-end credits exchange between an emitter node and a receiver node. A downside of a credit based end-to-end flow control is that at network endpoints, namely, in network interfaces of the node, each connection uses dedicated buffers, which can represent a cost in a case of multiple emitter nodes addressing data to a same receiver node.

Strict ordering comprises ordering network resources by introducing physical or virtual logically independent networks for each message type. For example, each router of the network needs two virtual channels. One channel is used for the request messages, and the other channel is used for the response messages. This separation of message types is maintained at all the nodes in the network.

In such a case, the request network is built separately from the response network. According to this approach, designing the network can become a complex process since it is not possible to know, when designing the network, the total number of virtual channels needed to route the messages through the nodes. At last, virtual circuits are an extreme case of strict ordering, in which each connection of the network between the nodes has its own logical network. Virtual circuits lead to an area penalty and to a less than optimum allocated resource utilization.

SUMMARY OF THE INVENTION

In view of the foregoing, a system and a process for transmitting data within a network from a plurality of emitter nodes to a receiver node of the network is provided. The system and process apply, in particular, to the communication methods in which messages are transmitted according to a so-called "message passing paradigm" in which data is directly transmitted from node-to-node without using a shared memory.

According to one embodiment, the receiver node is provided with first memory means or a first memory for storing data transmitted by each emitter node and data transmitted from one emitter node to the receiver node when a memory space is available in the first memory to receive data. In addition, each emitter node may comprise means or a transmitter for transmitting a request to the receiver node. The receiver node may comprise second memory means or a second memory for storing a request issued from each emitter node, and means for transmitting or a transmitter for transmitting to one emitter node an acknowledgement message when a memory space is available in the first memory to receive at least a part of the data to cause transmission of the data. The transmission of data between the one emitter node and the receiver node is locked until all data is transmitted.

According to another aspect, the second memory may comprise a memory space, the capacity to receive the requests from all the emitter nodes. For example, the second memory comprises a register.

According to yet another aspect, the first memory may comprise one memory shared between the emitter nodes and locked to one of the emitter nodes according to the request issued therefrom. For example, each emitter node and each receiver node may comprise the first and second memory and further comprise the means for transmitting the request and the means for transmitting the acknowledgement message such that each of the nodes works as a receiver or a transmitter node for the network.

For example, each node of the network comprises an emitter memory for storing data intended to be transmitted through the network and a receiver memory for storing received data, the emitter and receiver memories being shared between other nodes of the network. Each node may further comprise a message control unit associated with a selector stage to distinguish between request message data and an acknowledgement message received by the node. For example, each node further may comprise a look-up table in which routing control data is stored, the data being transmitted together with data extracted from the emitter memory to be transmitted therewith.

In one embodiment, each node further comprises a packetization block for elaborating a packet of data transmitted through the network. For example, in another embodiment, each node comprises an acknowledgement message manager block receiving incoming acknowledgement messages and adapted to control the message control unit to send data in the network. In such a case, each node may comprise a request manager block associated with the second memory for receiving incoming requests and generating an acknowledgement message when a memory space is available in the receiver of a memory. Each node may further comprise a de-packetization block for dispatching incoming data to the acknowledgement message manager block, to the request manager block and the second memory, and to the receiver memory.

According to another aspect, the request manager block comprises a space counter to control the available memory space, the counter value of which is modified according to the quantity of data received. Each node may comprise means or a detector for detecting in a received request, the number of data to be received and a data counter for detecting completion of data transferred. Completion of data transfer may also be detected using means for detecting, in received data, information indicating the completion of transfer.

According to another aspect, a flow control process for transmitting data within a network from emitter nodes to a receiver node is provided. The data is transmitted from one emitter node to the receiver node when a memory space is available in the first memory of the receiver node. In one embodiment, according to the flow control process, a request is emitted from an emitter node, received by the receiver node, and stored in second memory of the receiver node. An acknowledgement message is emitted by the receiver node to the emitter node when a memory space is available in the first memory. The data is transmitted after reception of the acknowledgement message by the emitter module.

According to another feature of the flow control process, the first memory is locked to store data from the emitter node after the request from the node has been granted. For example, the acknowledgement message indicates the space available in the first memory means.

According to another feature, the data is transferred by at least transferring successively data packets. The number of data packets transmitted may be counted in order to detect completion of data transfer and to unlock the first memory. Completion of data transfer may also be determined by detecting corresponding information in the data to unlock the first memory.

BRIEF DESCRIPTION OF THE DRAWINGS

Other features and advantages of the invention may become apparent from the following description, in view of the appended drawings, in which.

DETAILED DESCRIPTION OF THE PREFERRED EMBODIMENTS

Figure 1:
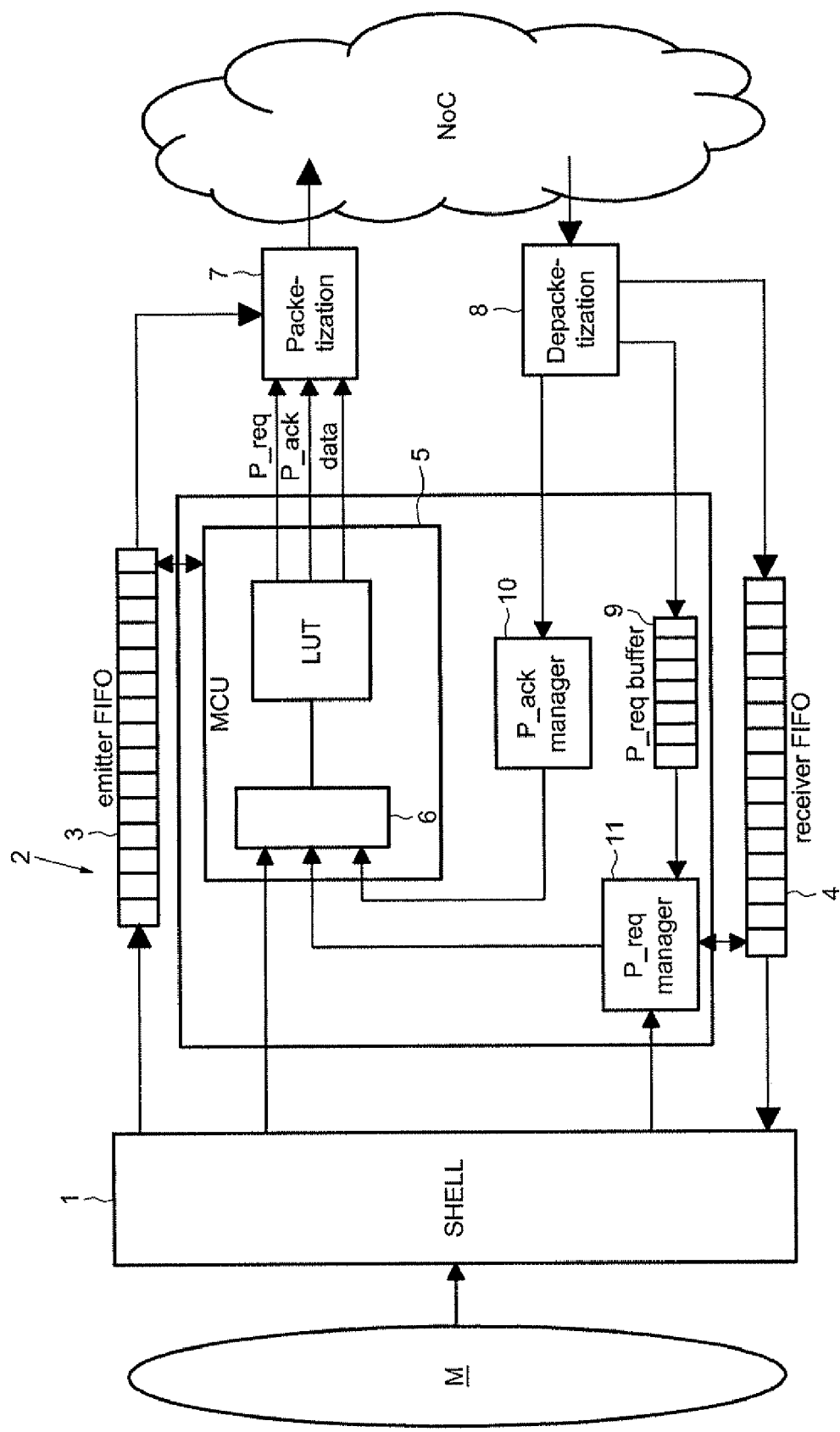
FIG. 1 schematically illustrates the structure of a system for transmitting data within nodes of a network according to the present invention.

Reference is first made to FIG. 1, where one embodiment of a system for transmitting data within a network is disclosed. In the example illustrated in this drawing, the system is provides communication within a NoC design from node-to-node of the network, avoiding, in particular, message-dependent deadlocks. This system can be used to implement a transmission of data in any other types of circuits and, for example, in circuits in which data are transmitted from node-to-node by emitting first, at an emitter side, a request to a receiver side, and by emitting, at the receiver side, an acknowledgement message when a receiver node is available to receive data from an emitter node.

The NoC is usually based on a packet switch communication concept and comprises mainly three NoC modules, namely: a router (R), a network Interface (NI), and a link. In the example shown in FIG. 1, one node is disclosed for providing a communication between one module M of the network and the remaining of the network, denoted NoC. For example, the architecture disclosed in FIG. 1 is implemented within the network interface of each node to provide communication while avoiding message-dependent deadlocks.

The description of the flow control process made hereinafter can be used to implement either an emitter node to transmit data to a receiver node or to implement a receiver node to received data from an emitter node. However, according to the embodiment disclosed, the node can be used either as an emitter node or a receiver node since, in the NoC design, each node can work either as an emitter node or as a receiver node. As shown, the network interface of each node comprises a first logical part and a second logical part.

The first logical part, denoted 1, comprises a shell that is generally responsible for providing an interface with an emitter node or with a receiver node of the NoC. On its side facing the module M, the shell may emulate the behavior of the protocol used by the module M. When the module M sends data to the network NoC, the shell 1 behaves as a slave regarding to the protocol. Conversely, when the module M receives data, the shell behaves as a master, considering the protocol.

The second logical part constitutes a kernel 2 in which data buffer, and, generally speaking, memory means or a memory are provided to store data before transmission and after reception and to store requests issued by other nodes. As the flow control process is based on kernel 2, the present description may now be focused on this second logical part 2.

As previously indicated, the node may comprise either an emitter node or a receiver node, according to the direction of the data transmission. As concerns the emission function of the node, namely when the module M is willing to forward data to the network NoC, a request P_req is emitted to a receiver node of the network NoC. Data are transmitted when a acknowledgement message P_ack is received from the receiver node.

As concerns the receiver function of the node, upon reception of a request P_req from an emitter node of the network, data received are stored in first memory, for example, a First-In-First-Out (FIFO) receiver memory. However, data is emitted by the distant emitter node only when the receiver node has emitted an acknowledgement message P_ack indicating that space is available in the receiver memory to receive data.

For that purpose, the receiver node receives the request P_req and stores it in a dedicated buffer, for example, a FIFO memory or only a register of a capacity sufficient to receive requests from the nodes of the network communicating therewith to handle all outstanding requests. This way, request messages are guaranteed to be treated upon arrival at the destination receiver module.

The receiver module locks its data receiver FIFO memory as used by the request message P_req. As soon as a certain amount of free space is available in the FIFO memory, the acknowledge packet is sent to the emitter node. For example, the acknowledgement message indicates how many free spaces are available in the FIFO memory. One space in the data FIFO memory considered for emitting an acknowledgement message has a width of one bit.

As a matter of fact, data message is usually broken into one or more bits for transmission. Such a packet is the smallest unit of information and contains routing and sequencing information. It is thus considered that one space in the data FIFO memory has a width of one bit. Accordingly, in other words, in one embodiment, the acknowledgement message indicates how many bits can be received and stored in the memory. In reply, the emitter node successively transmits a corresponding number of bits.

It should be noted that when a request P_req is issued from an emitter node, a space to handle a corresponding acknowledgement message P_ack is pre-allocated in the emitter node, guaranteeing that the acknowledgement message may be treated while reaching its destination. As soon as the emitter node receives the acknowledgement message, it sends on the network the corresponding data and thus makes the effective transfer, or part of the effective transfer, it wanted to do. Due to the exchange of requests and acknowledgement messages, it is guaranteed that data messages may be treated once reaching their destination. Consequently, using this protocol, no more is ever injected in the network than what can be processed.

Taking the transmission process into account, referring to the enclosed drawing, the kernel 2 of the network interface comprises an emitter memory, for example, a FIFO memory 3, in which data issued from the module M are stored, before transmission to the network NoC. Besides, the network interface further comprises a receiver memory 4; for example, a FIFO memory in which data issued from the NoC are stored, before being transferred to the module M through the shell 1. In addition, it comprises a message control unit MCU 5 associated with a selector stage 6 used to arbitrate between the different types of messages it receives, namely between requests P_req, acknowledgement messages P_ack or data.

In addition, a lookup table LUT is used to retrieve control information intended to be put in the packet header of data to be transferred to route a chosen message type to its destination node. A packetization block 7 makes the proper packets according to the signals it gets from the message control unit, and from the emitter memory 3, when used. The elaborated packet is made of a header having information for the router and of an actual message to be transferred over the NoC.

Besides, on the reception side, the network interface comprises a depacketization block 8 receiving packets from the router and dispatching the transmitted information according to the message type. Request messages are sent to a request buffer 9, where acknowledgement messages are transmitted to an acknowledgement message manager 10. In addition, data issued from received packets are stored in a receiver memory 4.

At last, as shown, the network interface comprises a request manager block 11 receiving data from the request buffer 9 and keeping trace of an established connection with an emitter node until it tears down. It may generate an acknowledgement message if N spaces corresponding to N bits are free in the receiver memory. For example, it comprises a space counter, which tracks the receiver memory and reserved space.

This is, for example, carried out by storing the counter a value corresponding to the capacity of the receiver memory and by decreasing the value according to the data received and stored within the receiver memory. At last, the acknowledgement message manager block 10 is in charge of collecting acknowledgement message packets and to ask the message control unit to generate the corresponding data message.

It should thus be noted that memories 3 and 4 receive data from the shell 1 or from the NoC and store them until they are told to deliver them to the network or to the shell 1. Memory 4, at the reception side, is dimensioned in order to guarantee a continuous data flow under the hypothesis that no contention occurs. The minimum data buffer size depends on the protocol and on the network parameters $T^{rt}$ and N. $T^{rt}$ represents the network round-trip latency and N is the maximum amount of a free space an acknowledgement message can report.

The memory size Q of the receiver memory 4 is at least of:

$$Q = \max_{j \in |P^i|} \{T_{i,j}^{rt} + N\}$$

However, it should also be noted that memories 3 and 4 are shared between all the nodes intended to communicate therewith. In other words, one memory is provided to store data to be transmitted in the network and one memory is used to store data received from the network. The request buffer 9 also shares and receives all the requests received from the nodes of the network.

Figure 2:
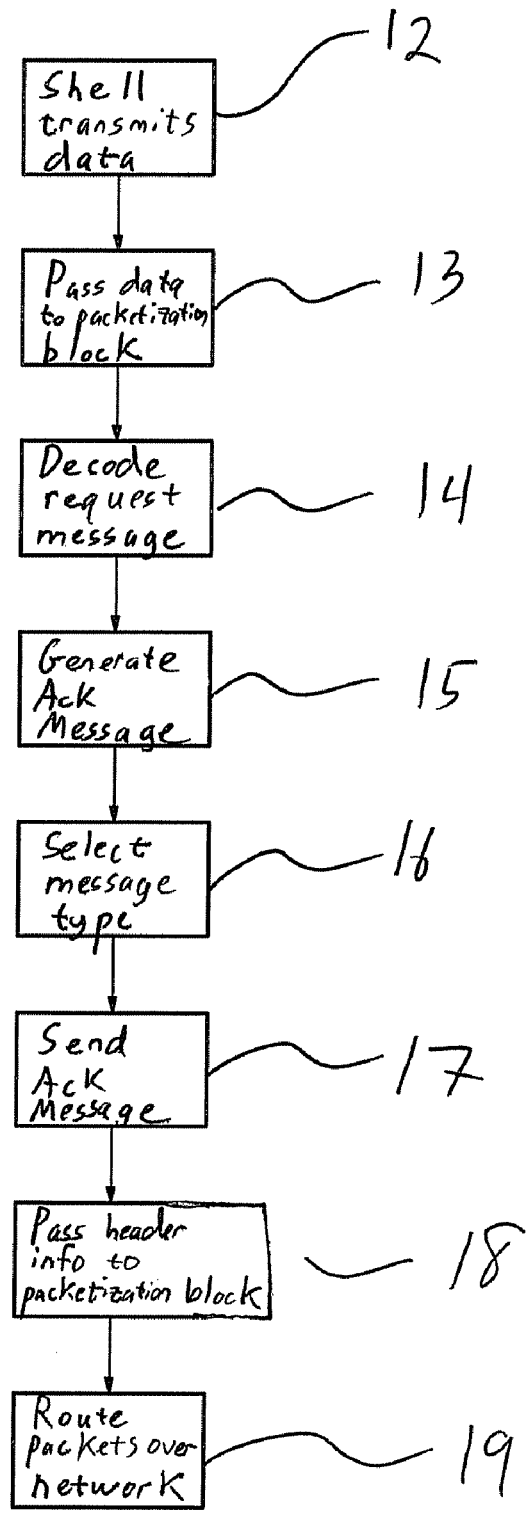
FIG. 2 is a flow chart illustrating a flow control process according to the present invention.

Referring to FIG. 2, an example of a data transfer carried out by the architecture illustrated in FIG. 1 is disclosed. This transfer protocol corresponds to a transmission of data from one emitter node to one receiver node. In a first step 12, shell 1 transmits data to be sent and matching control signals. Data are, upon reception, stored in the first receiver memory 3 and control signals are passed to the memory control unit MCU in order to constitute a request packet header. At step 13, this information is passed to the packetization block 6 to constitute a request packet P_req issued in the NoC network.

The request P_req is then routed over the network NoC to its destination node, where it is handled by the destination network interface. The depacketization block of the network interface of the receiver node decodes the request message and transfers it to the request buffer 9 (step 14). At step 15, the request manager 11 of the receiver module gets the first element of the request buffer 9 and starts the generation of the acknowledgement message whenever there is enough space in the receiver memory of the receiver module.

The receiver memory is then locked to receive data from the emitter node having emitted the request. The generated acknowledgement message is transmitted to the memory control unit 5 of the emitter module. As the memory control unit has to deal with several message types, the selector stage 6 is used to select the message to be sent according to an internal arbitration policy (step 16).

The acknowledgement message is then transmitted to the packetization block 7 with the matching routing information extracted from the lookup table LUT. The message elaborated by the packetization block 7 thus constitutes the acknowledgement message packet which is sent on the NoC back to the emitter node (step 17). The acknowledge packet P_ack is then routed over the NoC network to its destination network interface, namely the network interface to which the emitter node is connected, where it is handled by the corresponding depacketization block. The acknowledgement message is then decoded and transferred to the distant acknowledgement message manager.

The acknowledgement message is then transmitted to the memory control unit in order to cause the data message to be elaborated. The distant memory control unit thus retrieves from its lookup table information used to form the header of the data packets and triggers the emitter memory to read the data to be sent over the network NoC. The data and the header information are then passed to the packetization block to form the data packet sent in the network (step 18). At step 19, data packets are routed over the network to their destination network interface where they are handled by the depacketization block. The depacketization block decodes that it is data message and transfers it to the receiver memory 4.

At last, when a module M of the network needs to read new data from the network interface emitter memory 3, data is extracted from the memory and passed through the shell, which adapts the data to the corresponding protocol. As data is received from the memory, the space counter in the request manager is updated. It should be noted that data sent on the network NoC is constituted by a part or by the whole data to be transmitted corresponding to the space N available in the memory. For a given application, N can be tuned to reach the optimal performances for the network. As N is fixed, and as data transfers can have more than N bits, it is possible to send multiple acknowledgement messages for a single request.

If the amount of data to be transferred is lower than or equal to the maximum amount of the available space N indicated by P_ack message, then the request sets up the connection by locking the receiver FIFO. When enough space is available in the receiver FIFO to accommodate the data transfer, the receiver node sends back a P_ack message, which enables the overall data transfer from the emitter to the receiver. After this transfer, the connection is broken, the receiver data FIFO is unlocked, and a new transfer can occur, i.e. a new request message is handled by the receiver.

If the amount of data to be transferred is greater than the amount of the available space indicated by one P_ack message, then the request sets up the connection by locking the receiver FIFO. When N spaces are available in the receiver FIFO, the receiver sends back a P_ack message to the emitter, which involves the transfer of the N first bits of data. This sequence comprising emitting an acknowledgement message and the transferring N bits is repeated as long as the data transfer is not complete. As soon as the request has been granted, namely as soon as the P_ack message has been sent back to the emitter, the receiver FIFO is locked to receive data from the emitter. After the last bit has been transferred, the connection is broken, the receiver FIFO is unlocked, and a new transfer can occur, i.e. a new P_req message is handled by the receiver.

For example, completion of the transfer can be determined either by detecting corresponding information in the last bit transmitted or using a counter provided for example in the request manager block, the value of which corresponds initially to the overall capacity of the receiver memory, the counter being modified according to the quantity of received data. It is also possible, in one embodiment to provide that information relating to the amount of data to be transmitted is contained in the request, and a data counter is used for controlling the quantity of data successively transferred and thus detecting completion of data transfer.

That which is claimed is:

1. A network-on-chip (NoC) communications system comprising:
   at least one NoC receiver node comprising a first memory; and
   at least one NoC emitter node to transmit data and a request to said at least one NoC receiver node;
   said at least one NoC receiver node further comprising a second memory to store requests, and transmitting an acknowledgement message based upon the requests and when memory space is available in said first memory to receive at least a part of the data to cause transmission of the data, the acknowledgement message indicating an amount of free space in said first memory, said at least one NoC receiver node locking said first memory until all the data is transmitted.

2. The NoC communications system according to claim 1 wherein said second memory comprises a memory space, said memory space including capacity to receive the requests from said at least one NoC emitter node.

3. The NoC communications system according to claim 1 wherein said second memory comprises at least one register.

4. The NoC communications system according to claim 1 wherein said at least one NoC emitter node comprises a plurality thereof; wherein said first memory comprises a memory portion being shared between said emitter nodes; and wherein said memory portion is locked for a respective emitter node according to the respective request therefrom.

5. The NoC communications system according to claim 1 wherein said at least one NoC emitter node comprises a plurality thereof; and wherein each NoC emitter node further comprises a first memory, and a second memory, said NoC emitter nodes and said at least one NoC receiver node defining nodes transmitting and receiving data in the NoC network.

6. The NoC communications system according to claim 5 wherein said at least one NoC receiver node and said NoC emitter nodes each comprise an emitter memory for storing data for transmission through the network, and a receiver memory for storing data received from other nodes, said emitter and receiver memories being shared between other nodes of the network.

7. The NoC communications system according to claim 6 wherein said at least one NoC receiver node and said NoC emitter nodes each comprise a selector, and a message controller associated therewith for distinguishing between request messages and acknowledgement messages being received by the node.

8. The NoC communications system according to claim 7 wherein said at least one NoC receiver node and said NoC emitter nodes each comprise a lookup table for storing routing control data, the routing control data being transmitted together with data from said emitter memory.

9. The NoC communications system according to claim 8 wherein said at least one NoC receiver node and said NoC emitter nodes each further comprise a packetization block for forming a packet of data to be transmitted through the network.

10. The NoC communications system according to claim 7 wherein said at least one NoC receiver node and said NoC emitter nodes each comprise an acknowledgement message manager for receiving acknowledgement messages and for controlling said message controller to send data in the network.

11. The NoC communications system according to claim 10 wherein said at least one NoC receiver node and said NoC emitter nodes each further comprise a request manager associated with said second memory for receiving incoming requests and generating acknowledgement messages when a predetermined memory space is available in said receiver memory.

12. The NoC communications system according to claim 11 wherein said at least one NoC receiver node and said NoC emitter nodes each further comprise a depacketization block for dispatching incoming data to said acknowledgement message manager, to said request manager and said second memory, and to said receiver memory.

13. The NoC communications system according to claims 11 wherein said request manager comprises a space counter to control an available memory space, said space counter having a counter volume being modified according to a quantity of data received.

14. The NoC communications system according to claim 13 wherein said at least one NoC receiver node and said NoC emitter nodes each further comprise a detector for detecting, in a received request, an amount of data to be received, and a data counter for detecting completion of the data transfer.

15. The NoC communications system according to claim 13 wherein said at least one NoC receiver node and said NoC emitter nodes each further comprise a detector for detecting a completion of a data transfer.

16. A network-on-chip (NoC) communications system comprising:
at least one NoC receiver node comprising a first memory; and
at least one NoC emitter node to transmit data and a request to said at least one NoC receiver node;
said at least one NoC receiver node further comprising a second memory to store requests, and transmitting an acknowledgement message based upon the requests and when memory space is available in said first memory to receive at least a part of the data to cause transmission of the data, the acknowledgement message indicating an amount of free space in said first memory, said at least one NoC receiver node locking said first memory until all the data is transmitted.

17. The NoC communications system according to claim 16 wherein said at least one NoC emitter node comprises a plurality thereof; and wherein each NoC emitter node further comprises a first memory, and a second memory, said NoC emitter nodes and said at least one NoC receiver node defining nodes transmitting and receiving data in the network.

18. The NoC communications system according to claim 17 wherein said at least one NoC receiver node and said NoC emitter nodes each comprise an emitter memory for storing data for transmission through the network, and a receiver memory for storing data received from other NoC nodes, said emitter and receiver memories being shared between other nodes of the network.

19. A flow control method for transmitting data within a network-on-chip (NoC) network from at least one NoC emitter node to at least one NoC receiver node, the data being transmitted from a respective NoC emitter node to the at least one NoC receiver node when memory space is available in a first memory of the at least one NoC receiver node, the method comprising:
emitting a request from the respective NoC emitter node to the at least one NoC receiver node, the request being stored in a second memory of the at least one NoC receiver node;
emitting an acknowledgement message from the at least one NoC receiver node to the respective NoC emitter node when memory space is available in the first memory, the acknowledgement message indicating an amount of free space in the first memory; and
transmitting data after reception of the acknowledgement message by the at least one NoC emitter node, the at least one NoC receiver node locking the first memory until all the data is transmitted.

20. The method according to claim 19 further comprising locking the first memory to store data from the at least one emitter node after the request has been granted.

21. The method according to claim 20 wherein a number of data packets transmitted is counted to detect completion of data transfer and to unlock the first memory.

22. The method according to claim 20 wherein completion of data transfer is determined by at least detecting corresponding information in the data to unlock the first memory.

23. The method according to claim 19 wherein transmitting data comprises transmitting data packets successively.

* * * * *

UNITED STATES PATENT AND TRADEMARK OFFICE
CERTIFICATE OF CORRECTION

PATENT NO. : 7,940,788 B2  
APPLICATION NO. : 12/021004  
DATED : May 10, 2011  
INVENTOR(S) : Soulie et al.

It is certified that error appears in the above-identified patent and that said Letters Patent is hereby corrected as shown below:

| | |
|---|---|
| Column 1, Line 56 | Delete: "Message-dependent-deadlocks"<br>Insert: --Message-dependent deadlocks-- |
| Column 2, Line 4 | Delete: "because of a"<br>Insert: --because a-- |
| Column 3, Line 56 | Delete: "successively"<br>Insert: --successive-- |
| Column 4, Line 13 | Delete: "is" |
| Column 4, Line 34 | Delete: "received"<br>Insert: --receive-- |
| Column 4, Line 46 | Delete: "to" |
| Column 5, Line 18 | Delete: "data"<br>Insert: --a data-- |
| Column 6, Line 24 | Delete: "of a free"<br>Insert: --of free-- |

Signed and Sealed this  
Nineteenth Day of July, 2011

David J. Kappos  
*Director of the United States Patent and Trademark Office*